(No Model.)

G. R. ELLIOTT.
DOOR SPRING.

No. 329,297. Patented Oct. 27, 1885.

WITNESSES
John Enders Jr.
F. R. Harding.

Gilbert R. Elliott.
INVENTOR.
by O. E. Duffy
Attorney

UNITED STATES PATENT OFFICE.

GILBERT R. ELLIOTT, OF BOSTON, MASSACHUSETTS.

DOOR-SPRING.

SPECIFICATION forming part of Letters Patent No. 329,297, dated October 27, 1885.

Application filed July 3, 1885. Serial No. 170,562. (No model.)

*To all whom it may concern:*

Be it known that I, GILBERT R. ELLIOTT, of Boston, in the county of Suffolk and State of Massachusetts, have invented certain new and useful Improvements in Door-Springs; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in door checks or springs, the object of which is to facilitate the closing of doors and to prevent the slamming thereof; and it consists in the construction, arrangement, and combination of parts, to be hereinafter fully explained, and pointed out in the claims.

Figure 1:
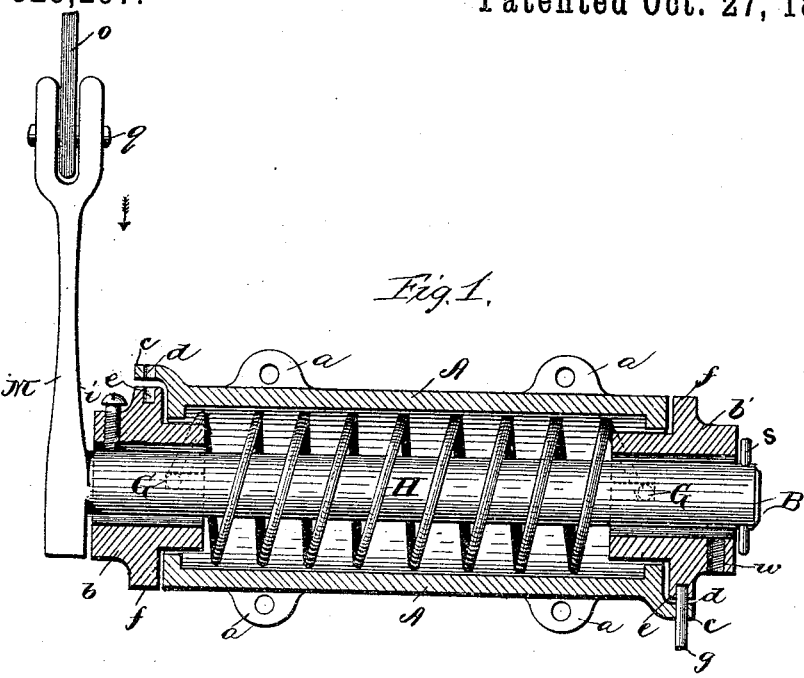
Figures 2, 3:
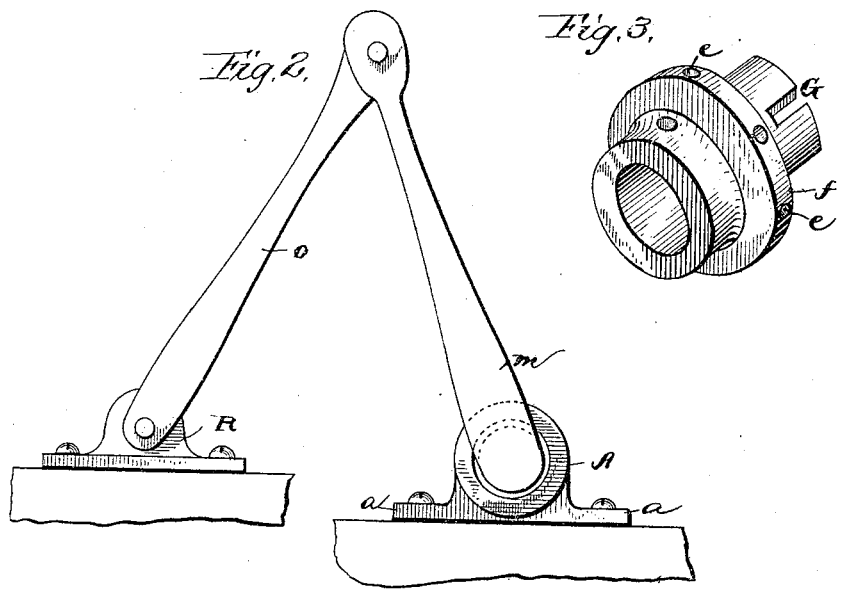

Referring to the accompanying drawings, Figure 1 is a central longitudinal section of my apparatus, clearly showing its novel features. Fig. 2 is an end view thereof, showing the connection between the door and jamb. Fig. 3 is a perspective view of the hub or sleeve.

In the specification like letters of reference denote like parts throughout the several figures, in which—

A represents the cylindrical casing, the ends of which are provided with apertures forming bearings for the hubs or sleeves $b$ $b'$, and it may be made of any suitable metal, and provided with lateral projections or lugs $a$, having holes for the purpose of receiving screws. By this arrangement the check is firmly fastened to the door or jamb. At each end of the case are formed flanges $c$ $c$, extending partly around the circumference of the cylinder. These flanges have formed therein holes $d$ $d$, that register with corresponding holes, $e$, said holes $e$ being arranged at certain distances apart around the periphery of flange $f$, which forms a part of the hub. $b$ $b'$, as heretofore referred to, are the hubs or sleeves. Preferably each hub is cast in one piece and forms an essential part of my invention, they having the flange $f$, into which are arranged the holes $e$, and an aperture running centrally through their length, in which turns the shaft B. The purpose of this hub or sleeve is to allow the check to be operated either from the door or jamb or from right to left when the check is secured to the door. The shaft B being connected to the hub $b$ by means of a screw, $i$, is, together with the hub, operated in the direction shown by the arrow 1. The hub $b'$ is here held in place and prevented from turning by pin $g$, but forms a bearing for shaft B. When it is desired to operate the check by attaching it to the jamb, the pin $g$ is removed from the hub $b'$ and inserted in the hole formed in the hub $b$, and in like manner the screw $i$ is reversed.

G is a slot formed in the hubs, through which the ends of spring H pass, and are secured to and around the shaft. These recesses are arranged to prevent twisting and working out of place of the spring, and as the ends are passed between the sides of the recess and secured to the shaft they greatly help the tension of the spring.

M is a crank-arm formed with the shaft in a single piece, and is bifurcated at its top to receive the end of the connecting-rod $o$, which is pivoted therein by a pintle, $q$. At the opposite end of the connecting-rod $o$ is secured in like manner a plate-bracket, R, provided with screw-holes for the purpose of securing the rod to the door or jamb, as the case might be.

$s$ is a pin extending through the end of shaft B, maintaining it in its normal position, the spring being arranged around the shaft and its ends rigidly held in place in the slots G of hubs. The door, being opened, unwinds the the spring, lessening its resiliency, so that when the door is violently shut the spring winds, which motion increases its resiliency, and therefore its resistance, and thus the door is eased to its position without slamming.

Having thus described my invention, what I claim as new, and desire to secure by Letters Patent, is—

1. In a door-check, the combination of the casing having flanges formed at its ends and lateral projections for the purpose of securing the check to the door or jamb with a hub or sleeve at each end of the casing, and with the shaft and spring, as hereinbefore set forth.

2. In a door-check, the combination of the casing A, having flanges $c$ $c$, into which are formed holes $d$, for the insertion of pin $g$, lugs $a$, as described, with hubs $b$ $b'$, provided with flanges $f$, having formed therein pin-holes $e$, which register with the holes $d$, an aperture, $u$, adapted to receive screw $i$, and the slot G and spring H, as hereinbefore set forth.

In testimony that I claim the foregoing as my own I affix my signature in presence of two witnesses.

GILBERT R. ELLIOTT.

Witnesses:
O. E. DUFFY,
F. R. HARDING.